United States Patent [19]

Gallery et al.

[11] Patent Number: 4,747,644
[45] Date of Patent: May 31, 1988

[54] PORTABLE DISPLAY STAND

[76] Inventors: Stanley A. Gallery, 11745 W. 66th Pl. Unit D, Arvada, Colo. 80003; Daniel J. Gallery, 11600 Shoshone, Westminster, Colo. 80234; Deborah A. Gallery, 241 Grant, Denver, Colo. 80204

[21] Appl. No.: 33,413
[22] Filed: Apr. 1, 1987
[51] Int. Cl.$^4$ .............................................. A47B 43/00
[52] U.S. Cl. .................................. 312/140; 312/250; 312/262
[58] Field of Search ............... 312/250, 262, 114, 140, 312/210, 244, 258, 140.2, 140.3

[56] References Cited

U.S. PATENT DOCUMENTS

| 282,794 | 8/1883 | Starling . | |
|---|---|---|---|
| 2,139,618 | 12/1938 | Hall | 312/257 SK |
| 2,722,468 | 11/1955 | Perrin | 312/257 SK |
| 2,808,305 | 10/1957 | Jackson | 312/258 X |
| 3,162,495 | 12/1964 | Swift . | |
| 3,527,514 | 9/1970 | Jefferson . | |
| 3,876,270 | 4/1975 | White | 312/257 R |
| 4,126,364 | 11/1978 | Reilly | 312/140 |
| 4,265,501 | 5/1981 | Halliburton | 312/258 X |
| 4,579,401 | 4/1986 | Mears . | |
| 4,585,283 | 4/1986 | Redmon et al. | 312/250 |
| 4,601,524 | 7/1986 | Ytter . | |

FOREIGN PATENT DOCUMENTS 287980 4/1928 United Kingdom ................ 312/140

Primary Examiner—Joseph Falk
Attorney, Agent, or Firm—Joseph J. Kelly

[57] ABSTRACT

A portable display stand comprising a base member plate provided with a mounting plate so that wheels may be mounted in an operational or stored position on the base member with the base member also being provided with a support system. A plurality of sidewall panels are provided and are hingedly connected together so that they may be moved to an operational position and supported on the support system or moved to a storage position. A top member plate is provided and has a channel system for receiving a portion of the sidewall panels to be supported thereby. A carrying case is provided and has walls defining a cavity for holding the base member plate with the wheels in a stored position, the plurality of sidewall panels in a stored position and the top member plate.

16 Claims, 5 Drawing Sheets

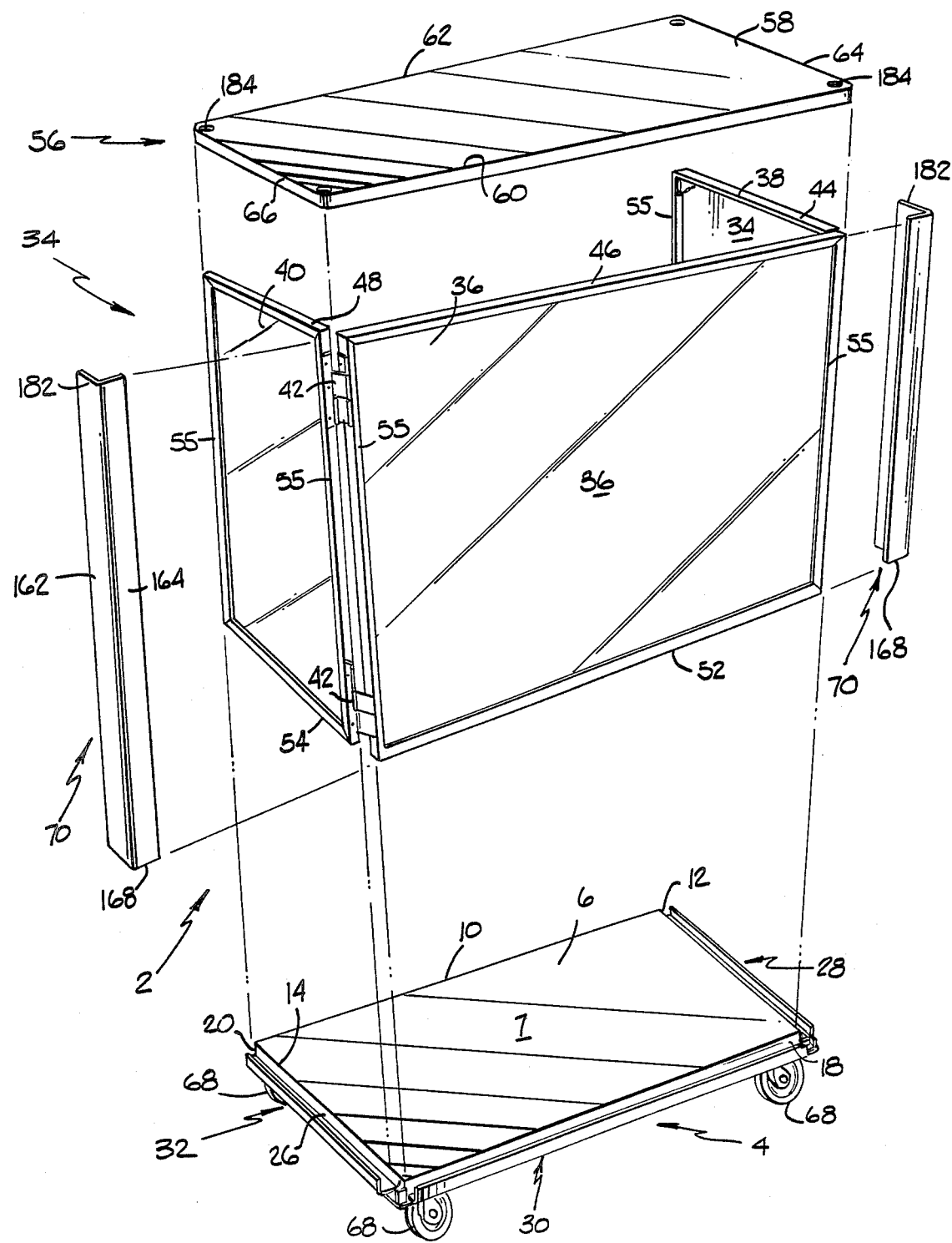

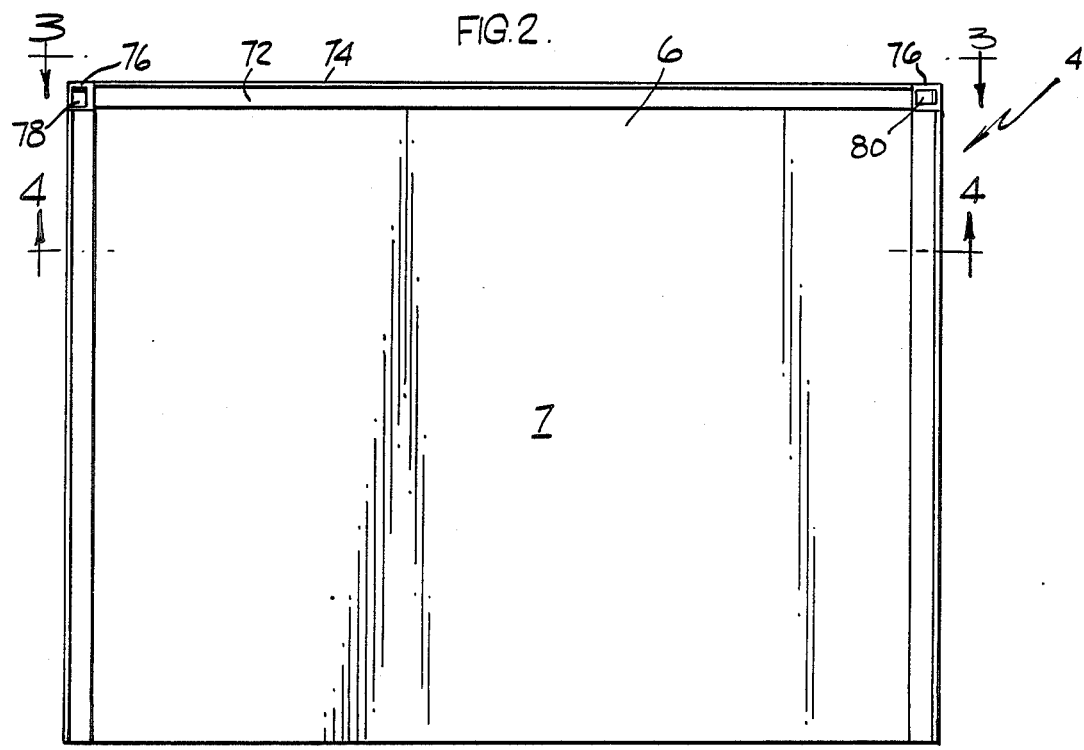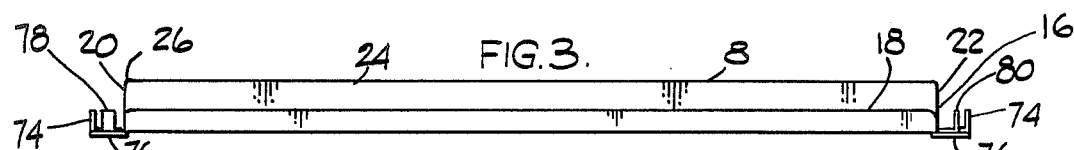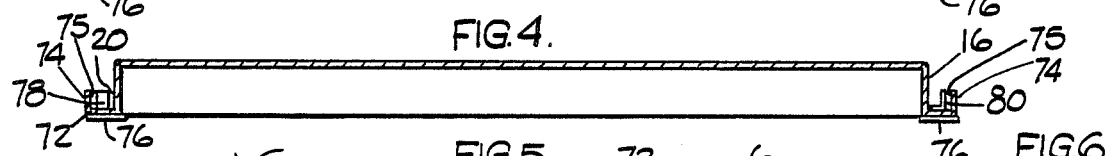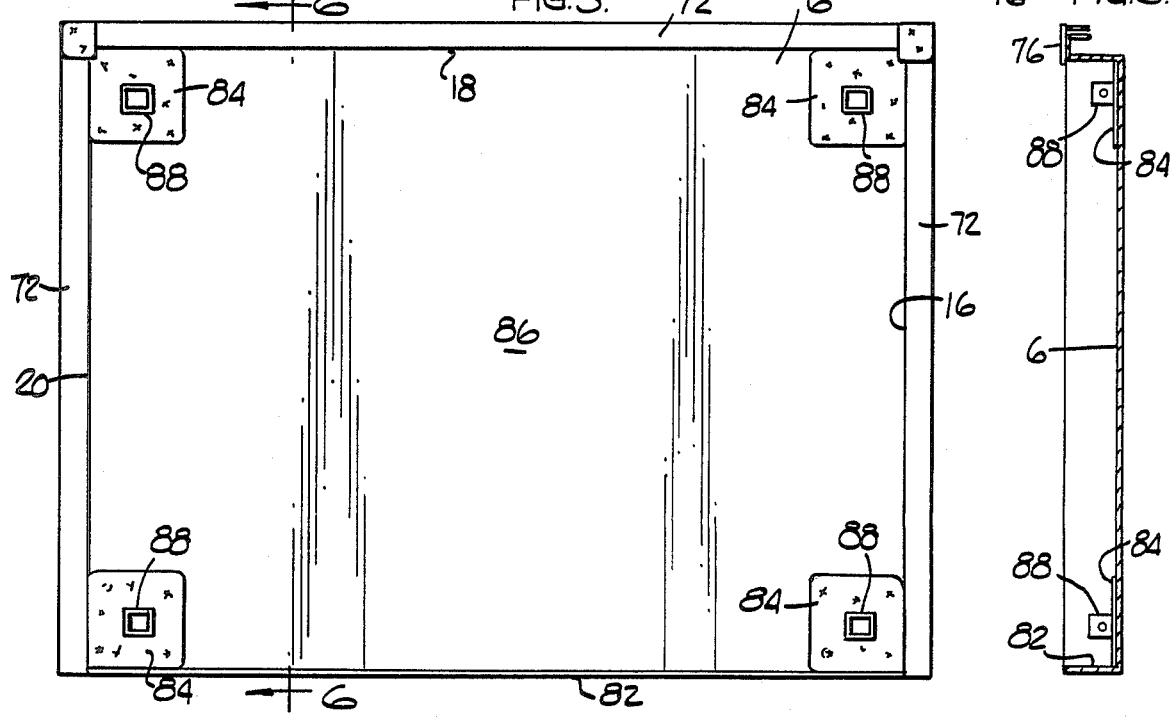

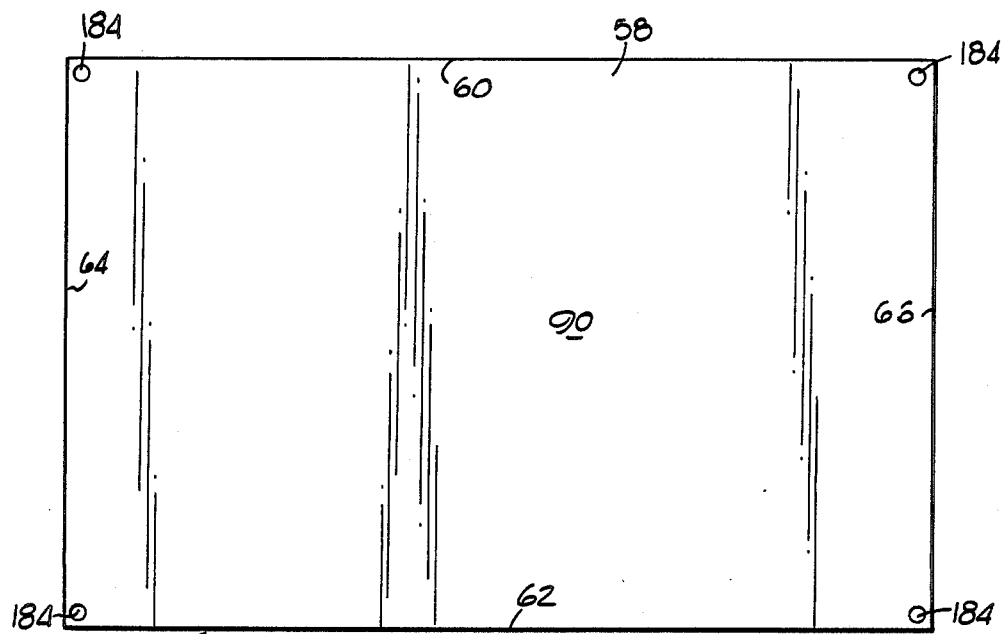
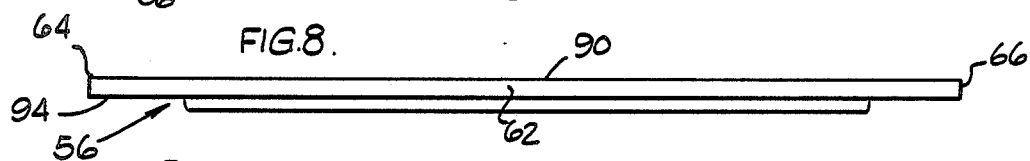
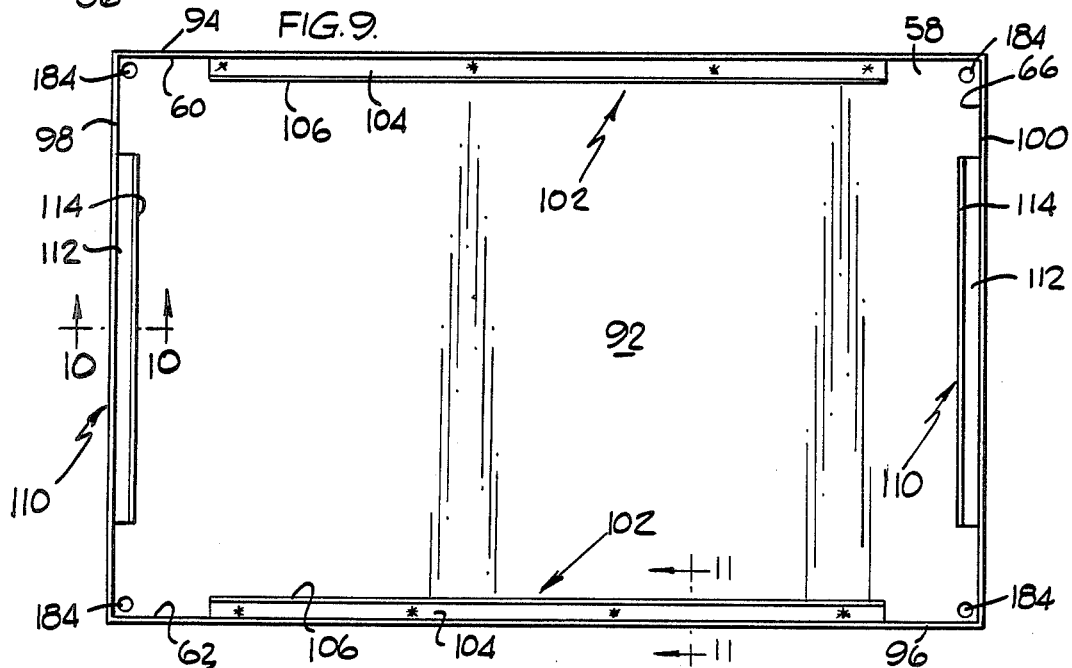
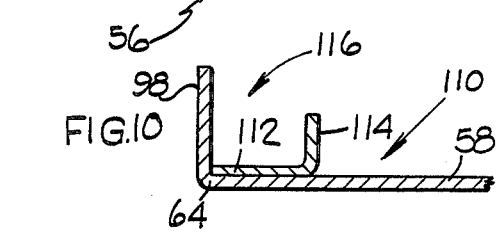
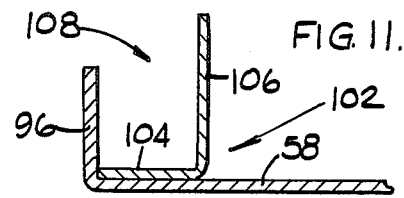

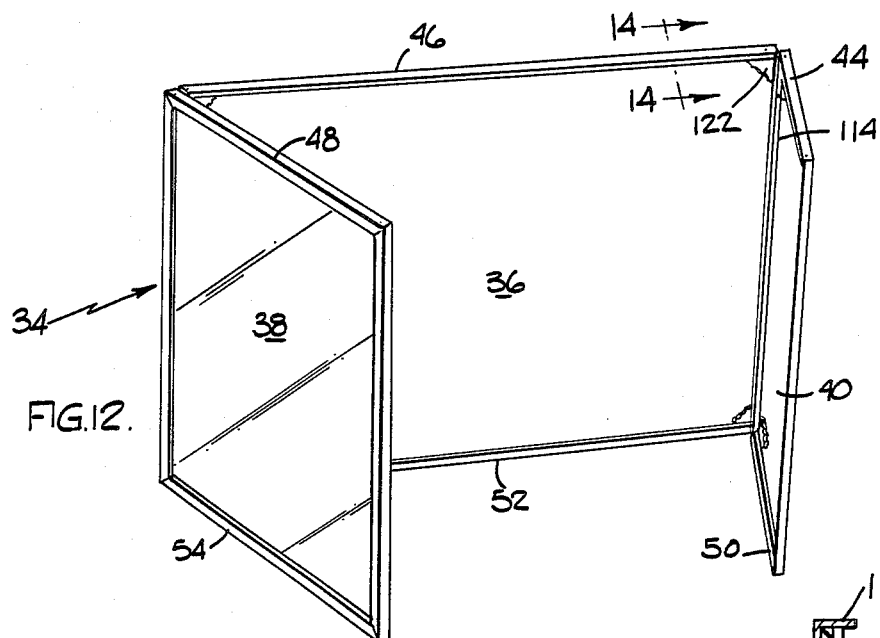
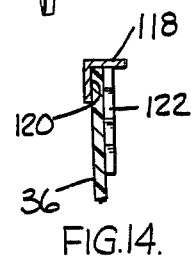
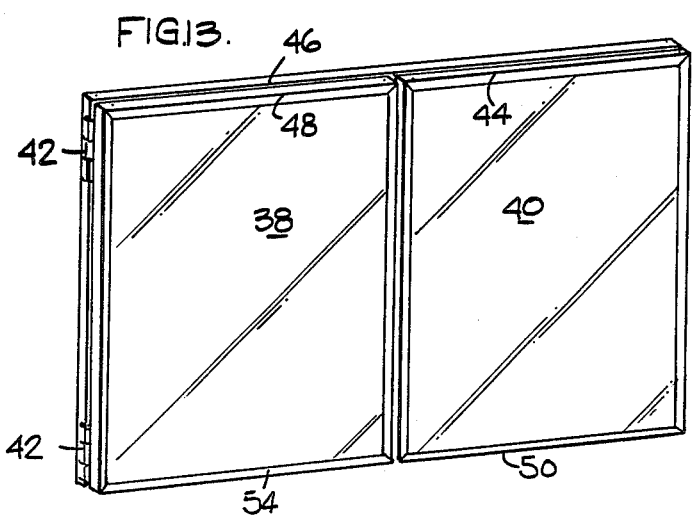
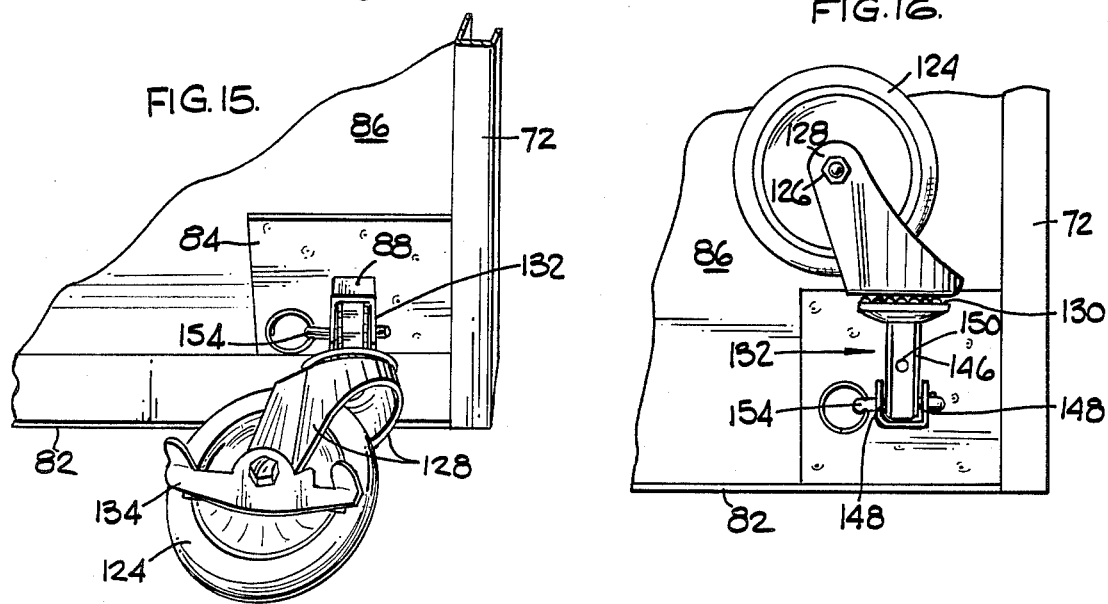

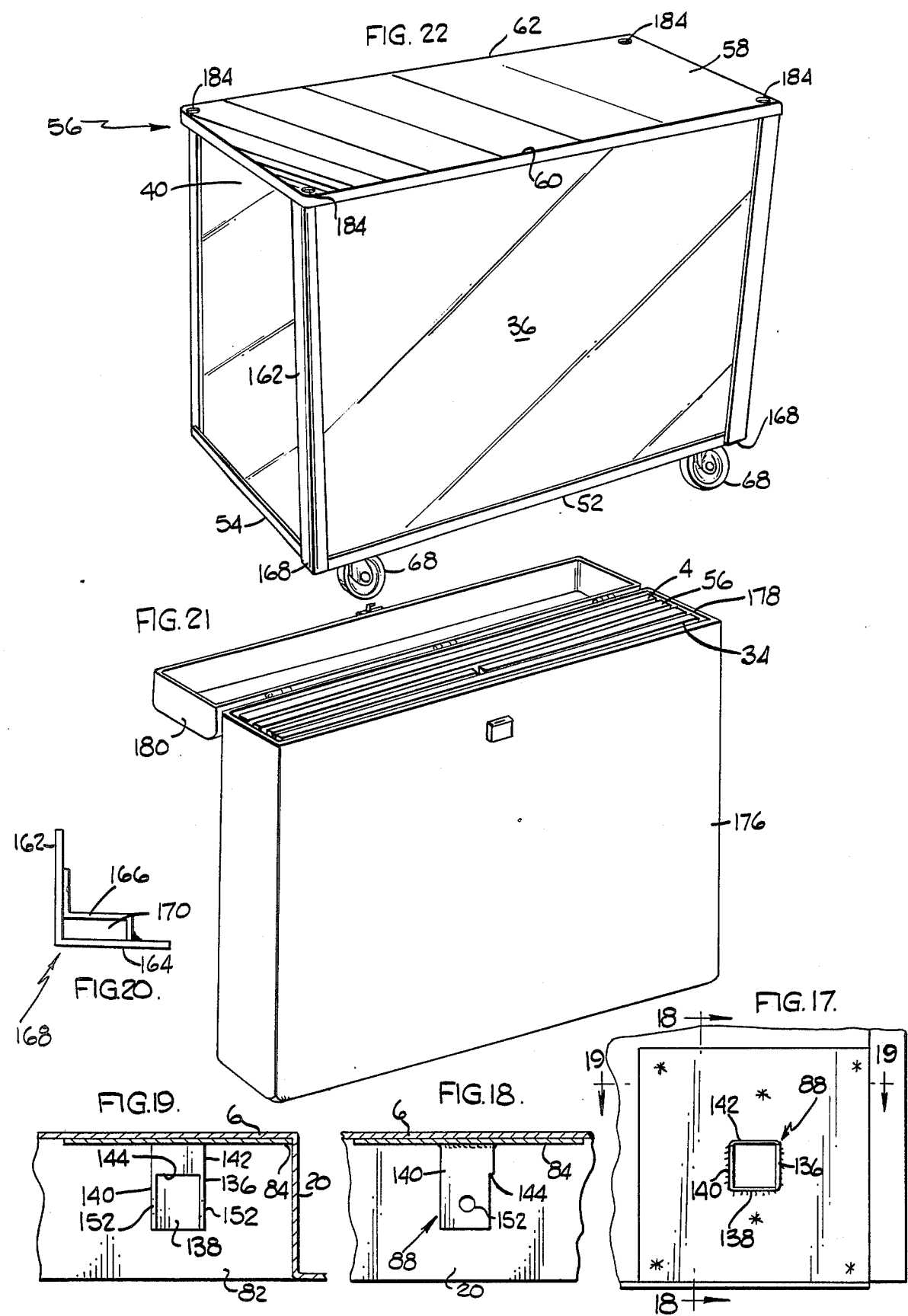

PORTABLE DISPLAY STAND

FIELD OF THE INVENTION

This invention relates generally to the field of display stands for use at convention centers, distributing markets, commercial food markets or similar locations for displaying merchandise and in many instances having an attendant for the purpose of distributing samples of the merchandise, such as food, and more particularly to a portable display stand and a carrying case therefor so that it may be readily transported from a storage location to the use location and be readily assembled thereat.

BACKGROUND OF THE INVENTION

Display stands are required in many instances for the display and many times disbursement of merchandise wherein the display stand is relatively small such as thirty to fifty-four inches in length and twenty-four to thirty inches in width. When the use includes the dispensing of merchandise, such as food or beverages, it is highly desirable that the display stand be sturdy since contact between a merchandise recipient and the display stand is likely to occur. Also, it is highly desirable that such a display stand can be stored in a collapsed condition in a storage area and be transported to the display area and be readily assembled thereat. While many attempts have been made to provide such a portable display stand, an improved portable display stand is always desirable.

BRIEF DESCRIPTION OF THE INVENTION

This invention provides a portable display stand and its carrying case wherein the portable display stand may be easily transported from a storage area to a use area and be readily assembled thereat by an ordinary sales or merchandising operator having limited mechanical capabilities. Also, the invention provides an improved display stand that is highly attractive and is extremely sturdy so as to withstand physical contact and be capable of an unlimited number of assembly and disassembly operations.

The preferred embodiment of the invention comprises a portable display stand having a base member means that is provided with wheel means at least one of which is swivelly mounted so that the display stand may be properly oriented when assembled at its use location. The mounting means for the wheel means permits the wheel means to be mounted in a useful position or a storage position. The base member means also includes a support means. A plurality of sidewall member means are provided and includes a plurality of sidewall panels including at least a front panel portion, a left side panel portion and a right side panel portion which are hingedly connected together so that they can be arranged at an angular relationship and have bottom edge portions to be supported by the support means of the base member or superposed in a storage relationship. A top member means is provided and has a channel means for receiving a portion of the top edge portions of the front panel portion and the left and right side panel portions when the display stand is assembled for use and has a natural shape for storage. At least two corner covering means are provided for covering exposed corners of the sidewall panels when in an assembled relationship. A carrying case is provided and has a cavity for readily receiving the base member means, the sidewall member means, the top member means and the corner covering means in a disassembled relationship.

BRIEF DESCRIPTION OF THE DRAWING

FIG. 1 is an exploded pictorial view of the portable display stand of this invention;

FIG. 2 is a top plane view of the base member means;

FIG. 3 is a front elevational view from the line 3—3 of FIG. 2;

FIG. 4 is a cross-sectional view taken on line 4—4 of FIG. 2;

FIG. 5 is a bottom plan view of the base member means;

FIG. 6 is a cross-sectional view taken on the line 6—6 of FIG. 5;

FIG. 7 is a top plan view of the top member means;

FIG. 8 is a front elevational view of FIG. 7;

FIG. 9 is a bottom plan view of the top member means;

FIG. 10 is a cross-sectional view taken on the line 10—10 of FIG. 9;

FIG. 11 is a cross-sectional view taken on the line 11—11 of FIG. 9;

FIG. 12 is a pictorial view of the sidewall member means in an open position prior to being assembled;

FIG. 13 is a pictorial view of the sidewall member means in a closed position for storage;

FIG. 14 is a cross-sectional view taken on the line 14—14 of FIG. 12;

FIG. 15 is a pictorial view of the wheel means mounted in a use position;

FIG. 16 is a bottom plan view of the wheel means in a storage position;

FIG. 17 is a bottom plan view of the wheel means support plate;

FIG. 18 is a cross-sectional view taken on the line 18—18 of FIG. 17;

FIG. 19 is a cross-sectional view taken on the line 19—19 of FIG. 17;

FIG. 20 is a bottom plan view of a corner covering means;

FIG. 21 is a pictorial view of the portable display stand in a carrying case; and FIG. 22 is a pictorial view of an assembled display stand.

DETAILED DESCRIPTION OF THE INVENTION

In FIG. 1, there is illustrated an exploded pictorial view of the portable display stand 2 having a base member means 4 comprising a generally planar, metallic base member plate 6 having opposed parallel front and rear edge portions 8 and 10 and opposed parallel left and right edge portions 12 and 14. Depending flanges 16 (FIG. 4), 18 and 20 extend downwardly from each of the front, left and right edge portions and each having an outer surface 22 (FIG. 4), 24, 26. The base member means 4 has U-shaped support channel means 28, 30 and 32 including therein the depending flange portions 16, 18 and 20. A sidewall member means 34 is provided comprising at least a front panel portion 36, a left side panel portion 38 and a right side panel portion 40 hingedly connected together by hinges 42. Each of the sidewall panels 36, 38 and 40 have opposed parallel top edge portions 44, 46 and 48 and bottom edge portions 50, 52 and 54 and side wall portions 55. A top member means 56 is provided and comprises a top member plate 58 having opposed parallel front and rear edge portions 60 and 62 and opposed parallel left and right edge portions 64 and 66. Wheel means 68, described more fully below, are mounted in the base member plate 6 so that the portable display stand 2 may be readily positioned at a desired location. A pair of corner covering means 70 are provided for covering the exposed corner portions of the sidewall member means 34. The portable display stand 2, as illustrated in FIG. 22, is assembled by placing the bottom edge portions 50, 52 and 54 into the U-shaped support channel means 28, 30 and 32. Then the top member means 56 is placed on and supported by the top edge portions 44, 46 and 48. The corner covering means 68 and 70 are then positioned as described below.

The structural details of the base member means 4 is illustrated more specifically in FIG. 2-6. The base member means 4 is formed by a conventional metal processing system to form the base member plate 6 having a top surface 7 and integral depending flange portions 16, 18 and 20. The U-shaped support channel means 28, 30 and 32 are formed in the same system by an integral section 72 extending generally parallel to the generally planar base member plate 6 and an upstanding leg portion 74 extending generally parallel to the depending flange portions 16, 18 and 20. The depending flange portions 16, 18 and 20 depend downwardly from the base member plate 6 for a distance substantially greater that the leg portion extends upwardly from the section 72. Each leg portion 74 has an inner surface 75 facing said outer surfaces 22, 24 and 26 and is spaced a desired distance therefrom. A support bracket 76 is secured by welding or other suitable means, to next adjacent portions of the integral sections 72. Upstanding positioning lugs 78 and 80 are secured to each support bracket 76 and, as illustrated in FIG. 3, the positioning lug 78 extends generally in a direction parallel to the depending flange portion 18 and the positioning lug 80 extends in a direction generally perpendicular to the depending flange portion 18 for a purpose described below. As illustrated in FIG. 6, an integral depending flange portion 82 extends downwardly from the rear edge portion 10. Wheel means support plates 84 are secured, by suitable means, such as by welding, to the bottom surface 86 of the base member plate 6 at the four corners defined by the intersections of the depending flange portions 16, 18, 20 and 82. A depending socket means 88 is secured to each of the wheel support plates 84, by suitable means such as by welding, for a purpose described below.

The structural details of the top member means 56 are illustrated in FIGS. 7-11 and comprises the top member plate 58 having generally planar top and bottom surfaces 90 and 92. Depending flange portions 94, 96, 98 and 100 are integral with and extend downwardly from the edge portions 60, 62, 64 and 66. Elongated right angled sections 102 having a base section 104 and a leg portion 106 are secured to the bottom surface 92 by suitable means, such as by welding, adjacent to the depending flange portions 94 and 96 so as to form a U-shaped channel means 108 therebetween with the inner surfaces of the depending flanges 94 and 96 facing and spaced a desired distance from the outer surfaces of the leg portions 106. Elongated right angled sections 110 having a base section 112 and a leg portion 114 are secured to the bottom surface 92 by suitable means, such as by welding, adjacent to the depending flange portions 98 and 100 so as to form a U-shaped channel means 116 therebetween with the inner surfaces of the depending flanges 98 and 100 facing and spaced a desired distance from the outer surfaces of the leg portions 114.

The structural details of the sidewall member means 34 is illustrated in FIGS. 12 and 13 wherein the edge portions 44 through 55 are formed of elongated right angled aluminum sections 118 with the plastic panel portions 36, 38 and 40 positioned against the inner surface 120 of each right angled section 118. A triangular shaped corner brace 122 is located in each corner and is secured by conventional means (not shown) to the right angled sections 118 at the intersections thereof and functions to reinforce the corners and to hold the panel portions 36, 38 and 40 against the inner surfaces 120.

The structural details of the wheel means 68 and its supporting structure are illustrated in FIGS. 15-19 wherein the wheel means 68 comprises a wheel 124 which is rotatably mounted on an axle 126 mounted in a bifurcated support means 128 which is swivelly mounted by bearings 130 forming part of a plug means 132. Conventional locking means 134 are provided to prevent rotation of the wheel 124 when desired. The wheel means 68 is illustrated in FIG. 15 in a use position and in FIG. 16 in a storage position.

The mounting means for the wheel means, FIGS. 17-19, comprises the socket means 88 which comprises four wall sections 136, 138, 140 and 142 which are secured to the wheel means support plate 84 by suitable means, such as by welding. The wall section 142 is shorter than the other wall section and terminates in a support edge 144. The plug means 132 comprises a member 146 having a cross-sectional configuration so that it will fit into the socket means 88 with preferably a friction fit. The member 146 is provided with spaced apart aligned openings 148 and 150 and the socket means 88 is provided with aligned openings 152 so that a pin 154 may be inserted through aligned openings 148 and 152 or aligned openings 150 and aligned openings 152 to hold the wheel means in the use position of FIG. 15 or the storage position of FIG. 16. As illustrated in FIG. 18, the aligned openings 152 in the socket means 88 will hold the wheel means 68, when in a storage position, between the plane defined by the edges of the depending flange portions 16, 18, 20 and 82 and the bottom surface 86 of the base member plate 6.

A corner covering means 70 is illustrated in FIGS. 1 and 20 and comprises an elongated right angled bar formed by two integral members 162 and 164. A bracket member 166 is secured to the members 162 and 164 adjacent one end 168 of the corner covering means 70. The bracket member 166 has an opening 170 which is adapted to receive the positioning lugs 78 or 80. The bracket member 160 is located so that the corner covering means may be used with the positioning lug 78 to cover the left corner or the positioning lug 80 to cover the right corner.

The left and right side panel portions 38 and 40 are hingedly connected to the front panel portion 36 by a pair of spaced apart hinge means 42. The hinge means 42 permit the left and right side panel portions 38 and 40 to be positioned to extend at a right angle to the front panel portion 36 so that the sidewall member means 34 may be positioned in the U-shaped support channel means 28, 30 and 32, as illustrated in FIGS. 1 and 12 or to be folded in a storage position, as illustrated in FIG. 13, with the left and right side panel portions 38 and 40 opposed to and extending parallel to the front panel portion 36.

The portable display stand 2 is illustrated in FIG. 21 in a carrying case 176 having an interior cavity 178 and a cover member 180. The interior cavity 178 is large enough to hold all of the components of the portable display stand such as the base member means 4, the top member means 56 and the sidewall member means 34. The portable display stand 2 is carried to the display location in the carrying case 176, removed from the carrying case 176 and assembled as indicated in FIG. 1 to form the portable display stand 2 illustrated in FIG. 22.

As illustrated in FIG. 1, the portable display stand 2 is assembled by first removing the wheels 124 from the storage position of FIG. 16 to the use position of FIG. 15 and using the locking means 134 to prevent rotation of the wheels 124. The sidewall member means 34 are opened so that the left and right panel portions 38 and 40 extend at a right angle to the front panel portion 36. The bottom edge portions 50, 52 and 54 are then inserted into the U-shaped support channel means 28, 30 and 32. If desired, the bottom edge portions 50, 52 and 54 and the U-shaped support channel means 28, 30 and 32 may be dimensioned so that there is a frictional fit therebetween. The top member means 56 is then positioned over the front, left and right panel portions 36, 38 and 40 so that the top edge portions 44, 46 and 48 thereof are located in the U-shaped channel means 108 or 116. A corner covering means 70 is then positioned over the left corner by placing the bracket 166 over the positioning lug 78 and lifting the top member means 56 so that the other end 182 of the corner covering means 70 may be inserted between the top edge portions 44 and 46 and the intersection of the depending flange portions 94 and 98. Another corner covering means 70 is then positioned over the right corner by placing the bracket 166 over the positioning lug 80 and lifting the top member means 56 so that the other end 182 of the corner covering means 70 may be inserted between the top edge portions 46 and 48 and the intersection of the depending flange portions 94 and 100. If desired, the top edge portions 44, 46, 48, the U-shaped channel means 108 and 116 and the members 162 and 164 may be dimensioned so that there is frictional engagement between the members 162 and 164 and the depending flange portions 94, 98 and 100 and the top edge portions 44, 46 and 48 and between the top edge portions 44, 46 and 48 and the leg portions 106 and 114. The wheels 124 are then unlocked so that the display stand 2 may be moved to a desired location. If desired, suitable means, such as threaded openings 184, may be provided for receiving support rods (not shown) to hold a canopy over the top member means 56.

The base member means 4, the top member means 56 and the various components associated therewith are formed of stainless steel in suitable gauges, such as 12, 14, 16, 18 and 20. The edge portions 118 are formed from aluminum and the panel portions comprise a plastic material such as polycarbonate or acrylic sheeting. The wheels 124 have rubber tires with a diameter of about 4.0 inches.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A portable display stand comprising separate sections which, in a disassembled relationship, may be combined into a storable and transportable package and which may be readily assembled without requiring tools for use as a sturdy, movable display stand where desired comprising:

at least base member means, sidewall member means and top member means;

said base member means comprising:
 a base member plate having a length, a width and a thickness and upper and lower surfaces;
 said base member plate having opposed parallel front and rear edge portions and opposed parallel left and right edge portions;
 depending flange portions depending substantially perpendicularly from at least said front, left and right edge portions and having an outer surface;
 fixedly located channel forming means for forming upwardly facing, external U-shaped support channel means including as a portion thereof said depending flange portions from each of said front, left and right edge portions;
 each of said U-shaped support channel means having one leg spaced from said depending flange portion and having an inner surface with said inner surface thereof being spaced a desired distance from said outer surface of said depending flange portion;
each of said U-shaped support channel means having an upwardly facing support surface;
said sidewall member means comprising:
 a plurality of sidewall panels comprising front, left and right sidewall panels which are hingedly connected together so that they may be moved relative to each other between a storage position and a use position;
 each of said sidewall panels having a length, a width and a thickness;
 each of said sidewall panels having opposed parallel top and bottom edge portions and opposed parallel side edge portions, each having substantially the same desired thickness;
said thickness of said bottom edge portion being slightly smaller than the distance between each of the legs and flanges of said U-shaped support channel means;
said top member means comprising:
 a top member plate having a length, a width and a thickness;
 said top member plate having opposed parallel front and rear edge portions and opposed parallel left and right edge portions;
 depending flange portions depending substantially perpendicularly from at least said front, left and right edge portions;
 fixedly located channel forming means for forming downwardly facing, internal U-shaped channels including as a portion thereof said depending flanges from at least said front, left and right edge portions and having a downwardly facing surface;
 each of said U-shaped channels having one leg spaced a desired distance from an opposed depending flange portion;
said thickness of said top edge portions of said sidewall panels being slightly smaller than said desired thickness between said one leg and said depending flange of said top member plate; and said base member means, said sidewall member means and said top member means are assembled in a relationship in which:

said bottom edge portions of said front, left and right sidewall panels are positioned in contact with said upwardly facing support surface of said U-shaped support channel means to be supported thereby;

said top edge portions of said front, left and right sidewall panels are positioned in contact with said downwardly facing surfaces of said U-shaped channels to support said top member plate; and movement permitting means mounted on said lower surface of said base member plate.

2. A portable display stand as in claim 1 wherein:

said desired thickness of said bottom edge portions of said front, left and right sidewall panels is slightly less than but substantially the same as said desired thickness of said U-shaped support channel means so that when said bottom edge portions are positioned in said U-shaped support channel means, there is a frictional fit therebetween.

3. A portable display stand as in claim 1 wherein said movement permitting means comprises:

a plurality of wheel means for movably supporting said base member plate; and mounting means for mounting each of said wheel means on said bottom surface.

4. A portable display stand as in claim 3 wherein:

said plurality of wheel means are at least four in number; and each of said mounting means is located adjacent to but spaced from the four intersections of said front, left, rear and right edge portions.

5. A portable display stand as in claim 4 wherein:

at least two of said wheel means are swivelly mounted.

6. A portable display stand as in claim 3 wherein each of said mounting means comprises:

socket means secured to and extending downwardly from said bottom surface;

plug means attached to each of said wheel means; and said socket means and said plug means having similar cross-sectional configurations so that said plug means may be inserted into said socket means.

7. A portable display stand as in claim 6 wherein:

said cross-sectional configurations of said socket means and said plug means are substantially rectangular.

8. A portable display stand comprising separate sections which, in a disassembled relationship, may be combined into a storable and transportable package and which may be readily assembled for use as a sturdy, movable display stand where desired comprising:

at least a base member means, a sidewall member means and a top member means;

said base member means comprising:

a base member plate having a length, a width and a thickness;

said base member plate having opposed parallel front and rear edge portions and opposed parallel left and right edge portions;

depending flange portions depending substantially perpendicularly from at least said front, left and right edge portions and having an outer surface;

fixedly located channel forming means for forming upwardly facing, external U-shaped support channel means including as a portion thereof said depending flange portions from each of said front, left and right edge portions;

each of said U-shaped support channel means having one leg spaced from said depending flange portion and having an inner surface with said inner surface thereof being spaced a desired distance from said outer surface of said depending flange portion;

said sidewall member means comprising:

a plurality of sidewall panels comprising front, left and right sidewall panels which are hingedly connected together so that they may be moved relative to each other between a storage position and a use position;

each of said sidewall panels having a length, a width and a thickness;

each of said sidewall panels having opposed parallel top and bottom edge portions and opposed parallel side edge portions, each having substantially the same desired thickness;

said top member means comprising:

a top member plate having a length, a width and a thickness;

said top member plate having opposed parallel front and rear edge portions and opposed parallel left and right edge portions;

depending flange portions depending substantially perpendicularly from at least said front, left and right edge portions;

fixedly located channel forming means for forming downwardly facing, internal U-shaped channels including as a portion thereof said depending flanges from at least said front, left and right edge portions;

each of said U-shaped channels having one leg spaced a desired distance from an opposed depending flange portion; and said base member means, said sidewall member means and said top member means are assembled in a relationship in which:

said bottom edge portions of said front, left and right sidewall panels are positioned in and supported by said U-shaped support channel means; and said top edge portions of said front, left and right sidewall panels are positioned in said U-shaped channels to support said top member plate;

at least two corner covering means having an inner surface and an outer surface;

each of said corner forming means comprising an elongated bar having a longitudinal axis and comprising two members having a right angular relationship and each having a longitudinal extending edge portion and having a length, a width and a thickness;

a support plate secured to said U-shaped support channel means at the intersection of said depending flange portions of said left and right side edge portions with said front edge portion of said base member plate;

male and female connections on each of one end of said elongated bars and said support plates so that one end of said elongated bar can be held in a supported position on said support plate; and the other end of said elongated bar being located between and in contact with portions of said depending flange portions of said left, front and right edge portions of said top member plate and with portions of said top edge portions of said front and right or left sidewall panels.

9. A portable display stand as in claim 8 wherein:
said members, said top edge portions of said front, left and right sidewall panels and said U-shaped channels are dimensioned so that portions of said other end of said elongated bar are in frictional engagement with portions of said depending flanges and portions of said top edge portion and portions of said top edge portions are in frictional engagement with portions of said legs of said U-shaped channels when said other end of said elongated bar is located between and in contact with portions of said depending flange portions of said top member plate and said top edge portion of said front and left or right sidewall panels.

10. A portable display stand as in claim 8 wherein:
each of said sidewall panels has a thickness substantially less than the thickness of each of said edge portions thereof.

11. A portable display stand comprising separate sections which, in a disassembled relationship, may be combined into a storable and transportable package and which may be readily assembled for use as a sturdy, movable display stand where desired comprising:
at least a base member means, a sidewall member means and a top member means;
said base member means comprising:
a base member plate having a length, a width and a thickness;
said base member plate opposed parallel front and rear edge portions and opposed parallel left and right edge portions;
depending flange portions depending substantially perpendicularly from at least said front, left and right edge portions and having an outer surface;
fixedly located channel forming means for forming upwardly facing, external U-shaped support channel means including as a portion thereof said depending flange portions from each of said front, left and right edge portions;
each of said U-shaped support channel means having one leg spaced from said depending flange portion and having an inner surface with said inner surface thereof being spaced a desired distance from said outer surface of said depending flange portion;
said sidewall member means comprising:
a plurality of sidewall panels comprising front, left and right sidewall panels which are hingedly connected together so that they may be moved relative to each other between a storage position and a use position;
each of said sidewall panels having a length, a width and a thickness;
each of said sidewall panels having opposed parallel top and bottom edge portions and opposed parallel side edge portions, each having substantially the same desired thickness;
said top member means comprising:
a top member plate having a length, a width and a thickness;
said top member plate having opposed parallel front and rear edge portions and opposed parallel left and right edge portions;
depending flange portions depending substantially perpendicularly from at leat said front, left and right edge portions;
fixedly located channel forming means for forming downwardly facing, internal U-shaped channels including as a portion thereof said depending flanges from at least said front, left and right edge portions;
each of said U-shaped channels having one leg spaced a desired distance from an opposed depending flange portion; and
said base member means, said sidewall member means and said top member means are assembled in a relationship in which:
said bottom edge portions of said front, left and right sidewall panels are positioned in and supported by said U-shaped support channel means;
said top edge portions of said front, left and right sideall panels are positioned in said U-shaped channels to support said top member plate;
said base member plate having a top surface and a bottom surface;
a plurality of wheel means for movably supporting said base member plate;
mounting means for mounting each of said wheel means on said bottom surface;
socket means secured to and extending downwardly from said bottom surface;
plug means attached to each of said wheel means;
said socket means and said plug means having similar cross-sectional configurations so that said plug means may be inserted into said socket means; and wherein
said socket means comprises wall means extending downwardly from said bottom surface and having a longitudinal axis;
at least one portion of said wall means extending for a distance substantially less than the other portion of said wall means to form an opening having spaced apart longitudinally extending edges; and
said longitudinally extending edges being spaced apart a sufficient distance so that said plug means may be positioned therein.

12. A portable display stand as in claim 11 wherein:
said plug means has a longitudinal axis;
said wheel means being rotatably mounted on said plug means so that its axis of rotation is perpendicular to said longitudinal axis of said plug means; and
holding means for holding said plug means in said socket means so that said longitudinal axis of said plug means coincides with said longitudinal axis of said socket means or said longitudinal axis of said plug means is perpendicular to said longitudinal axis of said socket means.

13. A portable display stand as in claim 12 wherein:
said cross-sectional configurations of said socket means and said plug means are substantially rectangular.

14. A portable display stand as in claim 13 wherein:
said cross-sectional configuration of said plug means is slightly smaller than but substantially the same as said cross-sectional configuration of said socket means so that when said plug means is inserted into said socket means, there is a frictional fit therebetween.

15. A portable display stand as in claim 14 wherein:
said plurality of wheel means are at least four in number;
each of said mounting means is located adjacent to but spaced from the four intersections of said front, left, rear and right edge portions;

at least two of said wheel means are swivelly mounted; and locking means for preventing rotation of said wheel means.

16. A portable display stand as in claim 15 wherein:

said desired thickness of said bottom edge portions of said front, left and right sidewall panels is slightly less than but substantially the same as said desired thickness of said U-shaped support channels so that when said bottom edge portions are positioned in said U-shaped support channels, there is a frictional fit therebetween;

at least two corner covering means having an inner surface and an outer surface;

each of said corner forming means comprising an elongated bar having a longitudinal axis and comprising two members having a right angular relationship and each having a longitudinal extending edge portion and having a length, a width and a thickness;

a support plate secured to said U-shaped support channel means at the intersection of said depending flange portions of said left and right side edge portions with said front edge portion of said base member plate;

male and female connections on each of one end of said elongated bars and said support plates so that one end of said elongated bar can be held in a supported position on said support plate;

the other end of said elongated bar being located between and in contact with portions of said depending flange portions of said left, front and right edge portions of said top member plate with portions of said top edge portions of said front and left or right sidewall panels;

said members, said top edge portions of said front, left and right sidewall panels and said U-shaped channels are dimensioned so that portions of said other end of said elongated bar are in frictional engagement with portions of said depending flanges and portions of said top edge portion and portions of said top edge portions are in frictional engagement with portions of said legs of said U-shaped channels when said other end of said elongated bar is located between and in contact with portions of said depending flange portions of said top member plate and said top edge portion of said front and left or right sidewall panels; and each of said sidewall panels has a thickness substantially less than the thickness of each of said edge portions thereof.

* * * * *